J. S. JOHNSTON.
DEMOUNTABLE RIM.
APPLICATION FILED FEB. 23, 1912.

1,191,081.

Patented July 11, 1916.

WITNESSES:

INVENTOR
JAMES S JOHNSTON
BY
ATTORNEY

UNITED STATES PATENT OFFICE.

JAMES S. JOHNSTON, OF UTICA, NEW YORK.

DEMOUNTABLE RIM.

1,191,081.  Specification of Letters Patent.  Patented July 11, 1916.

Application filed February 23, 1912.  Serial No. 679,305.

*To all whom it may concern:*

Be it known that I, JAMES S. JOHNSTON, a citizen of the United States, residing at Utica, in the county of Oneida and State of New York, have invented new and useful Improvements in Demountable Rims, of which the following is a specification.

My invention relates to a demountable rim and I declare the following to be a full, clear, concise and exact description thereof, sufficient to enable any one skilled in the art to which it appertains to make and use the same, reference being had to the accompanying drawings, in which like reference characters refer to like parts throughout.

The object of the invention is to provide an efficient device that is simple, inexpensive, and of commercial value, whereby a rim may be quickly detached from the felly of a wheel. The mechanism embodies a plurality of bolts embedded or passed through the felly of the wheel and having heads elongated in one direction, whereby to engage, when turned at a given angle, certain flanged locking plates secured to the inner surface of the rim.

The device is adapted to secure any suitable rim to a felly, however, I here show a rim such as described by me in an application filed Dec. 6, 1911, Serial No. 664,214.

Other objects will appear by referring to the drawings in which:

Figure 1 is a side elevation of a wheel showing a rim and tire assembled thereto; Fig. 2 is a plan view of the felly, showing certain bolts assembled to same; Fig. 3 is a plan view, looking upon the inner surface of the rim, showing the upper half removed; Fig. 4, is a perspective view of a fragment of the rim, enlarged, looking upon the inner surface thereof and showing a plate secured thereon; Fig. 5 is an enlarged fragment of the rim and felly, showing a circumferential section of parts and showing other parts in elevation; Fig. 6 is a perspective view of a bolt employed, said bolt being somewhat enlarged; Fig. 7 is a fragmentary view of the rim and tire, somewhat enlarged, showing a circumferential section of said parts and other parts in elevation; Fig. 8 is a plan view of a modified form of rim, cut upon any diameter and looking upon the inner surface thereof; Fig. 9 is an enlarged transverse section taken upon the line 9—9 of Fig. 8; Fig. 10 is a fragmentary view, showing the end portions of the rim detached; Fig. 11 is a plan view, looking upon the inner surface of the end portions of the rim; Fig. 12 is a fragmentary, enlarged view of the rim and felly, showing a central circumferential section thereof and a bolt in elevation.

Referring more particularly to the drawings, the felly of the wheel is represented by 1 and is supported by spokes 2 secured at their inner ends to hub 3. At given locations about said felly 1 there are disposed holes 4, extending radially through said felly 1 and located preferably near the connection of the outer ends of spokes 2 with felly 1. Holes 4 are adapted for the reception of bolts 5 having heads 6 which are elongated and tapered in opposite directions as at 7—7, whereby said portions 7—7 may engage in a recess 8 formed by the projection of flange 10 of plate 9, when said portions 7—7 of bolt 5 are turned substantially at the angle shown in Fig. 12, and disengage said projection or flange 10, when turned at an angle of 90 degrees to the aforesaid angle.

Plates 9 are welded or otherwise rigidly secured to the inner surface of rim 11 and are disposed at given locations to correspond with the locations of holes 4 in felly 1. Plates 9 may be of any suitable thickness and are provided with a central recess 12 terminating in a somewhat circular enlarged portion 13. As heretofore explained, the edge of the enlarged portion 13 is recessed on the side that rests adjacent the rim 11, within a short radius from the edge to provide a housing portion for the end parts 7—7 of head 6 of bolt 5, when said parts are assembled and the head is turned at the proper angle.

In Fig. 8 there is shown a modification or substantial equivalent of plates 9, which equivalent comprises circumferential plates 14—14 rigidly secured to the inner surface of rim 11 and providing recesses 15—15 on opposite sides, whereby portions 7—7 of heads 6 of bolts 5 may engage to secure rim 11 to felly 1, when the parts are assembled.

Tire 16 has secured thereto a valve 17 having a square projecting portion 18 adapted to be housed in the correspondingly shaped hole 19 in rim 11, when said tire is mounted upon the rim in assembled position. The employment of a square projecting portion 18 of valve 17 to fit in a square hole 19 in rim 11 prevents said valve from turning, when the parts are assembled, and thereby loosening itself from its normal position in tire 16.

To demount rim 11 from felly 1 of the wheel, is a simple operation involving merely the turning of nuts 20, so that washers 21 may be freed from their position against felly 1, and bolts 5 may be turned by means of a wrench or other like tool, engaging the squared ends 22 thereof, whereby to aline portions 7—7 of heads 6 of bolts 5 with recesses 12 of plates 9, so that rim 11 may be drawn off to one side from felly 1 of the wheel.

When the parts are reassembled, bolts 5 are turned so as to assume the positions as shown in Figs. 1 and 12 and are locked in such positions by tightening upon nuts 20. The tightening or turning of nuts 20 will have a tendency to draw rim 11 toward felly 1, which function is a highly commendable feature, inasmuch, as it secures said rim more firmly to the felly.

Holes 4 for the reception of bolts 5 are located preferably near the jointure of spokes 2 with felly 1, whereby the portion of felly 1 surrounding or adjacent said holes 4 may be strengthened by the additional support given thereto by the nearness of spokes 2.

The ends 25—25 of rim 11 are detachably held in a rigid manner upon the felly —1— by bolts 26—26 housed in felly —1— and having heads 27—27, which are elongated in one direction, whereby to engage the sides of correspondingly shaped holes 28—28 in either end 25—25 of rim 11. Bolts 26 are provided with squared ends 29, similar to the ends 22 of bolts 5, whereby said bolts 26 may be turned to release heads 27 thereof from holes 28 in rim 11. Bolts 26 are also locked in position by washers 30 and nuts 31. Heads 27 of bolts 26 are covered by a plate 32 secured at one end to the inner surface of rim 11, as at 33, so that said heads 27 will not injure the adjacent surface of tire 16.

Having thus described my invention, what I claim as new and desire to secure by Letters Patent is:

1. In a rim of the character described, the combination of a plurality of plates, secured to the inner surface of said rim, central recesses in said plates, circular recesses opening into said central recesses, recesses adjacent the surface of the rim, in said plates, bolts mounted upon a felly, heads on said bolts, said heads being adapted to engage the recesses adjacent the surface of the rim, in said plates, whereby to hold said rim to said felly.

2. In a rim, the combination of a plurality of plates, secured to the inner surface of said rim, central recesses in said plates, circular recesses connecting with said central recesses in said plates, bolts mounted upon a felly, elongated and tapering heads on said bolts, means for turning said bolts, whereby the elongated heads thereof will engage the circular recesses to hold said rim to said felly, substantially as described.

3. In a rim, plates secured to the inner surface thereof, recesses in said plates, other recesses opening into said first named recesses, other recesses adjacent the surface of said rim in said plates, bolts mounted upon a felly, heads on said bolts, said heads being adapted to engage the recesses adjacent the surface of the rim, in said plates, whereby to hold said rim to said felly.

In witness whereof I have hereunto subscribed my name this 14th day of February, 1912.

JAMES S. JOHNSTON.

Witnesses:
SAMUEL SLOAN,
DAVID B. LISLE.

Copies of this patent may be obtained for five cents each, by addressing the "Commissioner of Patents. Washington, D. C."